(12) United States Patent
Van Vuegt et al.

(10) Patent No.: US 9,079,366 B2
(45) Date of Patent: Jul. 14, 2015

(54) METHOD FOR PRODUCING FUSELAGE CELL SECTIONS FOR AIRCRAFT WITH COMPOSITE FIBRE MATERIALS, AND A DEVICE

(75) Inventors: Carsten Van Vuegt, Bremen (DE); Christoph Meyer, Stemwede (DE); Georg Lonsdorfer, Stade (DE); Thomas Meyn, Lamstedt (DE); Helmut Felderhoff, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 1320 days.

(21) Appl. No.: 12/664,623

(22) PCT Filed: Jun. 12, 2008

(86) PCT No.: PCT/EP2008/057405
§ 371 (c)(1),
(2), (4) Date: Nov. 15, 2011

(87) PCT Pub. No.: WO2008/152103
PCT Pub. Date: Dec. 18, 2008

(65) Prior Publication Data
US 2012/0055617 A1 Mar. 8, 2012

Related U.S. Application Data

(60) Provisional application No. 60/943,707, filed on Jun. 13, 2007.

(30) Foreign Application Priority Data

Jun. 13, 2007 (DE) .......................... 10 2007 027 113

(51) Int. Cl.
*B29C 70/44* (2006.01)
*B29D 99/00* (2010.01)
*B29L 31/30* (2006.01)

(52) U.S. Cl.
CPC .......... *B29C 70/446* (2013.01); *B29D 99/0014* (2013.01); *B29L 2031/3082* (2013.01); *Y02T 50/433* (2013.01)

(58) Field of Classification Search
CPC .. B29C 65/00; B29C 66/00145; B32B 37/00; B32B 37/10; B64C 1/00; B64C 2001/0072; B64C 2001/0081; B64C 1/06; B64C 1/061; B64C 1/068; B64C 1/069; B64C 1/08; B64C 1/10; B64C 1/12
USPC .......... 156/285, 286, 382; 264/511, 526, 553, 264/566, 568, 571; 425/504, 405.1, 405.2, 425/388
See application file for complete search history.

(56) References Cited

U.S. PATENT DOCUMENTS 3,962,393 A    6/1976 Blad
(Continued)

FOREIGN PATENT DOCUMENTS

CA    2598765 A1    7/1998
(Continued)

OTHER PUBLICATIONS

Russian Decision on Granting, Russian Application No. 2009145995/05(065623), Apr. 23, 2012, 4 pages.
(Continued)

*Primary Examiner* — Richard Crispino
*Assistant Examiner* — Matthew Hoover
(74) *Attorney, Agent, or Firm* — Fenwick & West LLP

(57) ABSTRACT

The invention relates to a production method for producing seamless, integral aircraft fuselage sections. The method comprises the following steps:
 a) application of a first vacuum film to a stable winding core and evacuation of the first vacuum film,
 b) depositing of the fuselage section in layers on the winding core by wrapping the same,
 c) application of an outer mold that is unstable compared to the stable winding core, to the fuselage section, wherein the winding core stabilizes the outer mold,
 d) application of a second vacuum film to the outer mold,
 e) aeration of the first vacuum film and evacuation of the second vacuum film in order to draw the fuselage section closer to the outer mold and detach it from the winding core at least in one region,
 a) curing of the entire arrangement in an autoclave to produce the finished fuselage section.

10 Claims, 3 Drawing Sheets

(56) References Cited

U.S. PATENT DOCUMENTS

| | | | | |
|---|---|---|---|---|
| 4,681,724 A | * | 7/1987 | Faiz et al. | 264/257 |
| 5,170,967 A | * | 12/1992 | Hamamoto et al. | 244/119 |
| 5,716,488 A | * | 2/1998 | Bryant | 156/382 |
| 2001/0008659 A1 | | 7/2001 | Nelson et al. | |
| 2004/0188882 A1 | | 9/2004 | Matsumoto et al. | |
| 2005/0206043 A1 | | 9/2005 | Frankel | |
| 2006/0108058 A1 | * | 5/2006 | Chapman et al. | 156/245 |

FOREIGN PATENT DOCUMENTS

| | | |
|---|---|---|
| DE | 103 31 358 A1 | 2/2004 |
| DE | 10 2005 020 274 A1 | 11/2006 |
| JP | 61 027223 A | 2/1986 |
| RU | 2168820 C1 | 6/2001 |
| RU | 2203838 C2 | 5/2003 |
| SU | 1813654 A1 | 5/1993 |
| WO | WO 98/32589 | 7/1998 |

OTHER PUBLICATIONS

PCT International Search Report and Written Opinion of the International Searching Authority, PCT/EP2008/057405, Apr. 12, 2008, 12 pages.

German Office Action, German Application No. 10 2007 027 113.3, Feb. 15, 2008, 8 pages.

* cited by examiner

METHOD FOR PRODUCING FUSELAGE CELL SECTIONS FOR AIRCRAFT WITH COMPOSITE FIBRE MATERIALS, AND A DEVICE

CROSS-REFERENCE TO RELATED APPLICATIONS

This application claims the benefit of U.S. Provisional Application No. 60/943,707, filed Jun. 13, 2007 and German Patent Application No. 10 2007 027 113.3, filed Jun. 13, 2007, the entire disclosures of which are herein incorporated by reference.

FIELD OF THE INVENTION

The invention relates to a method for producing a seamless fuselage section for an aircraft with composite fibre materials.

Methods of prior art for producing seamless fuselage sections from a composite fibre material are in many cases based on a rotary winding core on which the fuselage section is formed by winding onto it an endless prepreg material in the form of a strip (so-called "automated fibre placement" process (AFP process). After the completion of the actual winding process the fuselage is introduced into a vacuum bag. The layers, placed in the form of laminations, resulting from the action of the force from ambient air pressure, are compacted by evacuating the vacuum bag. At the same time any air bubbles, air inclusions or the like that may be present are drawn out of the laminate. Finally the entire structure is fed into an autoclave for final hardening and completion of the fuselage section. To facilitate removal of the finished component from the mould, the winding core is formed with a plurality of segments which can be displaced inwardly. In addition the winding core may, parallel to its longitudinal axis, have a multiplicity of recesses into which the stiffening profiles are inserted before the actual winding process, in order equip the main panel of the fuselage section in one operation with stiffening profiles arranged on the inside, e.g. stringers or the like. The stringers may, for example, have a T-shaped or trapezoidal (Q-shaped) cross-sectional geometry.

The main difficulty with this conventional method of production resides in the fact that the surface quality of the components is relatively low and a precisely defined outside diameter of the finished component cannot be obtained because of shrinkage of the composite material.

To improve surface quality a method is also known for bringing pressure plates mounted in a floating manner to bear upon the component from the outside. However, on the one hand this gives rise to the difficulty that no completely uniform pressure distribution is achieved if there are any geometrical deviations between the pressure plates and the component (e.g. radii of curvature that deviate slightly from each other), and on the other hand irregularities may occur in the surface in the region of the joints between the pressure plates.

SUMMARY OF THE INVENTION

The object of the invention is to avoid the disadvantages of the methods of prior art for producing seamless fuselage sections from composite fibre materials.

This object is achieved by a method with the following features of Claim 1:
a) application of a first vacuum film to a stable winding core and evacuation of the first vacuum film,
b) depositing of the fuselage section in layers on the winding core by wrapping the same,
c) application of an outer mould that is unstable compared to the stable winding core, to the fuselage section, wherein the winding core stabilises the outer mould,
d) application of a second vacuum film to the outer mould,
e) aeration of the first vacuum film and evacuation of the second vacuum film in order to draw the fuselage section closer to the outer mould and detach it from the winding core at least in one region,
f) curing of the entire arrangement in an autoclave to produce the finished fuselage section.

Initially a first vacuum film is applied to the winding core serving as the "inner mould", the evacuated. To achieving optimum contact of the first vacuum film against the winding core, particularly in the region of the recesses for receiving the stiffening profiles, it may be necessary to heat the vacuum film after and/or during evacuation by means of a hot air fan in order to increase plastic deformability.

The component, particularly a fuselage section, for example, is then produced in one piece in the so-called AFP process ("Automated Fibre Placement" process), by depositing (endless) prepreg strip material on the rotating winding core. Alternatively it is also possible to allow the winding core to remain stationary and to guide a prepreg depositing head around the winding core.

The prepreg material is a carbon fibre reinforcing strip arrangement which is saturated in a hardenable epoxy resin. After the component is completed an outer mould is guided onto the component, which in turn is surrounded by a second vacuum film. By aerating the first (inner) vacuum film the component is detached or raised from the winding core, at least in regions.

By evacuating the second vacuum film surrounding the outer mould in a pressure-tight manner the component, which is still "wet", i.e. not yet hardened and formable, is then pressed on the inside against the outer mould already brought into position and closed in the radial direction. The outer mould consists of a plurality of bent pressure plates whose inner surfaces exactly correspond to the desired outer contour of the finished component when brought together.

The at least two pressure plates are joined fixedly together along their longitudinal flanges, e.g. by screw connections, and form an outer mould rigidly closed in on itself in the radial direction.

The entire arrangement is finally hardened in an autoclave. The bent pressure plates are, for reasons of weight, formed with a composite fibre material which has a material thickness of up to 50 mm.

The pressure plates are preferably produced with a carbon fibre reinforced epoxy resin. In order to protect the outer mould from undesirable natural deformations the inner winding core is still required even after the detachment of the wound component, at least in regions.

The winding core is preferably formed with a metal material with the lowest possible coefficient of thermal expansion. A suitable material for producing the (inner) winding core is, for example, an "$Ni_{36}$" alloy. The winding core is preferably formed with at least three inwardly displaceable segments in order to be able to remove the wound or deposited component from the mould. When moved away from each other the segments of the winding core form the desired inner contour of the component to be developed in as precise a manner as possible.

The first and second vacuum films are sealed from each other and from the winding core with double-sided adhesive tape, for example, which is arranged on the peripheral side in the region of the ends of the winding core.

High surface quality of the finished component is achieved by the inventive method together with good dimensional stability, particularly in terms of a predetermined theoretical diameter and a required theoretical cross-sectional geometry of the fuselage section. Due to the in principle high surface quality of a fuselage section produced by the inventive method expensive remachining steps, for example grinding, priming or polishing, may be dispensed with.

According to a development of the inventive method provision is made for stiffening profiles, particularly stringers or the like, to be inserted in recesses in the winding core, the recesses running essentially in the longitudinal direction of the winding core.

This enables the fuselage section to be fitted with stiffening profiles, particularly stringers, arranged on the inside, in one production step simultaneously with the production of the fuselage cell skin. For example, the stiffening profiles may have a T-shaped or a Ω-shaped cross-sectional geometry. To achieve adequate support of the stiffening profiles inserted in the recesses and/or undercuts when the component is removed from the winding core, filling elements are arranged in the region of the stiffening profiles. the filling elements are formed, for example, with a hard foam material.

In addition, the object of the invention is achieved by a device, particularly one for carrying out the inventive method, with the following features of Claim 9.

a) A winding core surrounded by a first vacuum film in a pressure-tight manner for depositing a component, b) an outer mould surrounding the component deposited on the winding core, c) a second vacuum film, which encloses the outer mould in a pressure-tight manner, and d) at least one sealant for sealing the first and second vacuum films against the winding core.

Because of the presence of the first vacuum film the component can be detached or raised from the winding core after completion of the winding process by aerating this inner vacuum film. The second vacuum film, in conjunction with the outer moulds, then serves to press the component firmly against the inside of the outer mould. Because of the presence of two vacuum films, the winding core and the outer mould enclosing the component relatively tightly and closed in the radial direction, it is possible for the first time to produce wound fuselage sections with a composite fibre material of extraordinarily high surface quality and at the same time excellent dimensional stability in one operation.

The vacuum films are sealed from each other and from the winding core by means of a double adhesive tape. Alternatively seals, for example "film tear-off seals", etc., that can be detached several times, may also be considered as sealants. The vacuum films have a high temperature resistance for resisting hardening in the autoclave. Moreover, the vacuum films must have high tear resistance, elasticity, expandability and deformabilty so that the vacuum films nestle with their recesses on the inner winding core in particular, if possible free from folds and cavities.

Further advantageous embodiments of the method and device are described in other claims.

DESCRIPTION OF EXEMPLARY EMBODIMENTS

Figure 1:
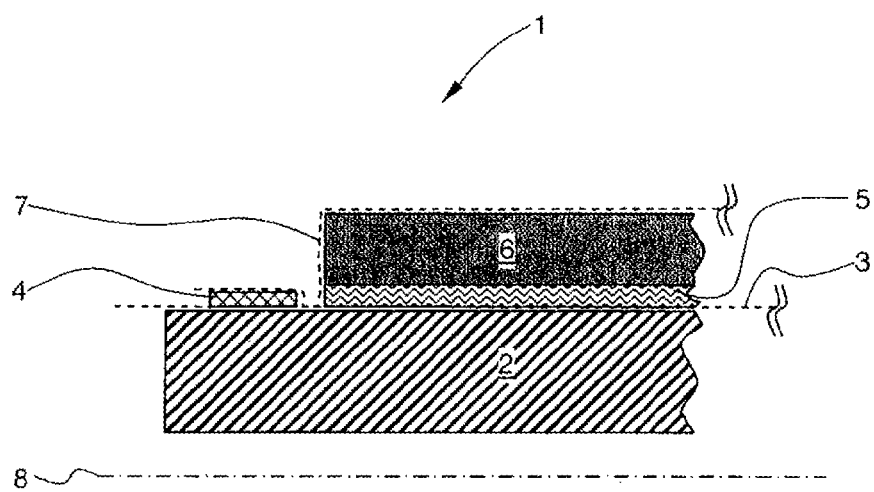
FIG. 1 shows an explanatory representation of the device.

In the drawing the same structural elements each bear the same reference number.

FIG. 1 shows an explanatory representation of an end region of the device which has an essentially hollow cylindrical overall structure.

Device 1 for carrying out the inventive method comprises, among other things, an essentially hollow cylindrically shaped metal winding core 2, which is completely surrounded by a pressure-tight first vacuum film 3. Device 1 is constructed on its other end region, not shown, mirror symmetrically to the end region shown in FIG. 1. First vacuum film 3 is sealed from winding core 2 by a sealant 4, which in the exemplary embodiment shown is designed as a double adhesive tape, i.e. an adhesive band coated adhesively on both sides. On winding core 2, which rotates during the production process, component 5 is produced by automated depositing of an endless prepreg strip material in a laminated fashion. Preferably at least one carbon fibre reinforcing strip arrangement, preimpregnated with a hardenable epoxy resin, is used as the prepreg material, which resin is pulled off from storage bobbins. The deposited component 5 is preferably an essentially hollow cylindrical integral fuselage section of an aircraft with an essentially rotationally symmetrical cross-sectional geometry. Component 5 deposited in one piece on winding core 5 may attain a diameter of up to 8 m, a length of up to 25 m and a wall thickness of up to 10 mm. The fuselage section may also have an oval or elliptical cross-sectional geometry.

An outer mould 6 is not applied to component 5, which in this process stage is still soft, i.e. not hardened and therefore still plastically formable within limits, until the winding process is completed. A high surface quality of component 5 is achieved by pressing component 5 against the inside of outer mould 6 since the outer mould ensures smoothing of the outer contour. Moreover, this keeps the diameter of component 5 within close predetermined tolerances. Outer mould 6 is fully enclosed, in a pressure-tight manner, by a second vacuum film 7. Both first vacuum film 3 and second vacuum film 7 represent, in terms of their function, vacuum bags which can be evacuated by a multiplicity of connections, not shown, by means of vacuum pumps not shown. During the winding process winding core 2 rotates about a longitudinal winding core axis 8. The spoke-like struts, which are not provided with a reference number and point towards the longitudinal winding core axis in the radial direction, symbolise the movement and positioning mechanics of winding core 2 for the positioning the winding core segment not shown in FIGS. 2 to 4 either in order to enable component 5 to be removed from the mould by the "collapse" of winding core 2 in the radial direction of axis 8 (cf. in particular FIGS. 5, 6).

For a more detailed explanation of the method process reference is also made to FIGS. 2 to 5 in their entirety, which reproduce the condition of the device in chronological order when implementing the method.

In a first method step first vacuum film 3 is pulled onto winding core 2 and sealed against it. When first vacuum film 3 is evacuated it must be guaranteed that it nestles closely without folds on winding core 2, and, in particular, bears without cavities against any recesses. After first vacuum film 3 is applied, component 5 is deposited on winding core 2 in laminated fashion, in particular by means of an AFP process. After completion of the laying process an outer mould 6 is placed on component 5 deposited on winding core 2 in a further method step.

In the exemplary embodiment illustrated in FIGS. 2 to 5 outer mould 6 is formed with two positionable, bent pressure plates 9, 10. An inner surface 12 of bent pressure plates 9, 10 connected to each other forms exactly the desired outer contour of component 5. Outer mould 6 is preferably formed with at least four pressure plates which are produced in a lightweight construction with a fibre reinforced plastic material, and in particular with bent plates of a carbon reinforced epoxy resin, with a material thickness of up to 50 mm. The composite fibre material used also gives rise, in the case of large dimensions, to high dimensional stability of pressure plates 9, 10, but the relatively low thermal conductivity of pressure plates 9, 10 results in longer dwell times in the autoclave during the hardening process. Pressure plates 9, 10 may be of a sandwich construction to achieve higher dimensional stability with reduced charge weight.

Figure 2:
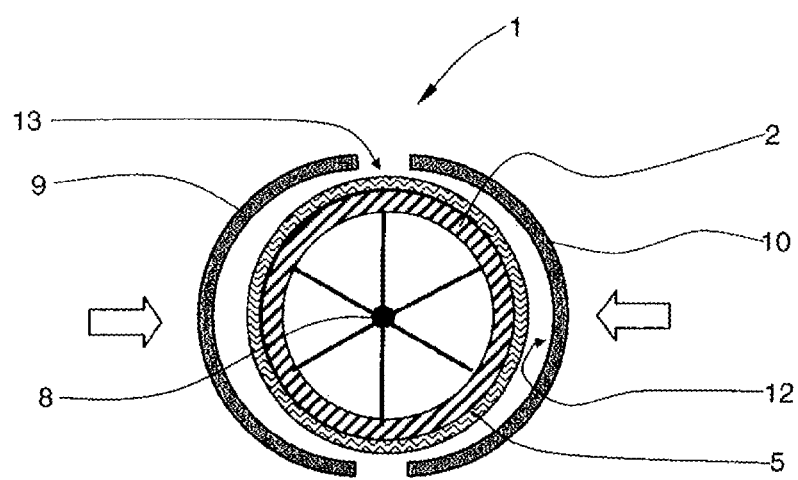
FIGS. 2-5 show a diagrammatic cross-sectional representation through the device with the outer mould, the winding core and the component in different stages of the method.
Figure 3:
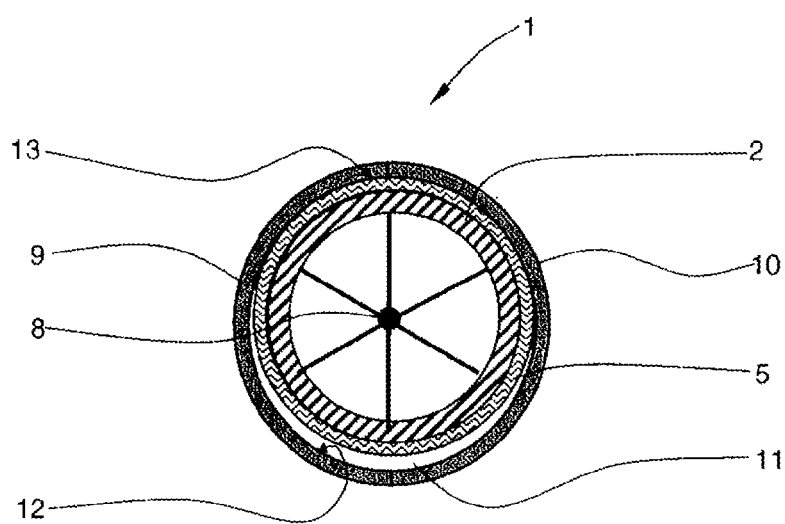

In the representation in FIG. 3 pressure plates 9, 10 have reached their limit position by a movement in the direction of the white arrows starting from the position in FIG. 2, in which limit position they are connected fixedly to each other in the radial direction and form an outer mould 6 closed in on itself. The cross-sectional geometry of component 5 is predetermined by outer mould 6. Pressure plates 9, 10 can be connected to each other, for example, by screw or clamped connections.

An inside diameter of outer mould 6 is slightly larger than an outside diameter of component 5 deposited on winding core 2, so that a lower intermediate space 11 is formed. Second vacuum film 7 is them placed in a pressure-tight manner around outer mould 6. Vacuum films 3, 7 are sealed against each other and against winding core 2 by strip sealant 4, particularly in the form of a double-sided adhesive tape which runs on the peripheral side in the end regions of the arrangement.

Figure 4:
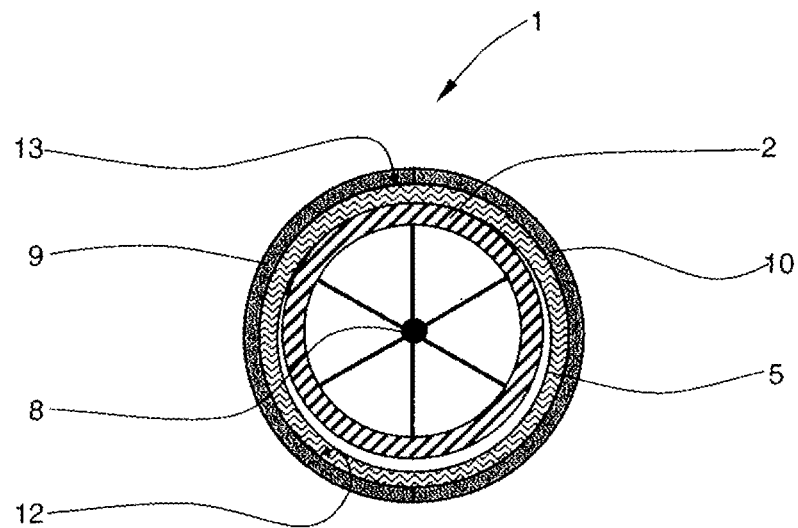
Figure 5:
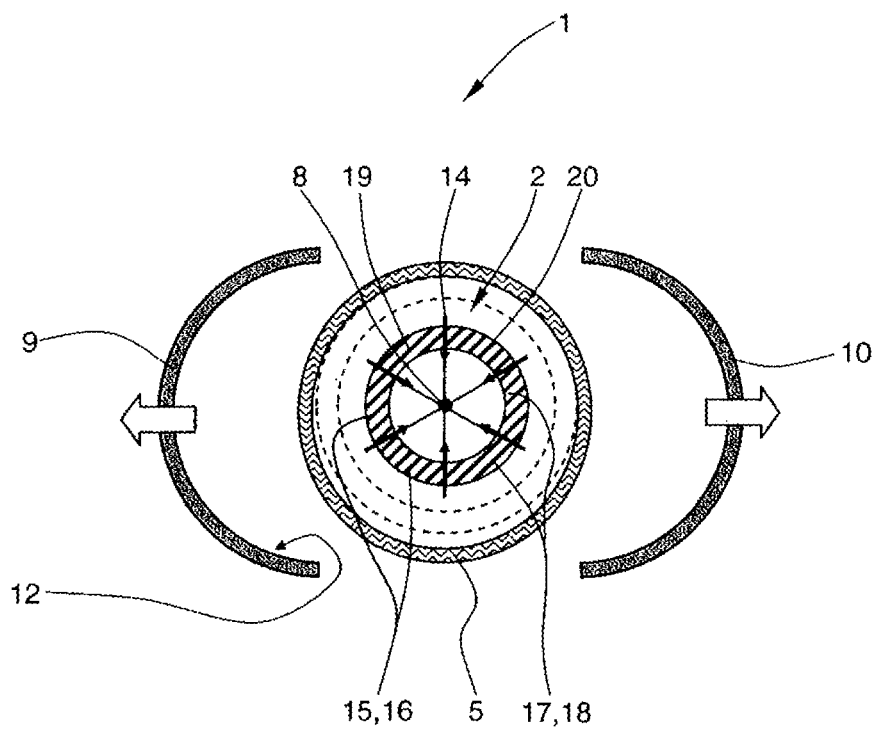

In a further method step first vacuum film 3 is aerated and second vacuum film 7 is evacuated, as a result of which component 5 is detached from winding core 2, at least in regions, and is pressed firmly against an inner face 12 of outer mould 6, and intermediate space 11 disappears (cf. FIGS. 3,4). On the one hand this ensures that the outer surface of component 5 achieves a high surface quality due to the smoothing action of pressure plates 90, 10, and on the other outer mould 6 gives component 5 a precisely defined cross-sectional geometry.

Due to the limited natural stability of outer mould 6, however, its stabilisation by winding core 2, with component 5 lying on it, is still required. As can be seen from the representation in FIG. 3, outer mould 6 therefore still bears against component 5 in an upper region 13.

In a subsequent method step the entire structure is fed into an autoclave for hardening at a pressure of up to 10 bars and a temperature of up to 200° C.

In a subsequent method step pressure plates 9, 10 are again moved apart in the direction of both white arrows, as can be seen in the representation in FIG. 4, so that component 5 can be removed from the mould. For final removal of component 5 from the mould winding core 21 is moved inwards, in the direction of longitudinal winding core axis 8 and in the direction of the black arrows, one arrow 14 of which is provided with a reference number to represent all the others, so that component 5 can be raised from winding core 2 free of undercuts. For this purpose winding core 2, in the exemplary embodiment shown, is formed with six essentially annular winding core segments 15 to 20, which are designed so that they can be moved in the direction of longitudinal winding core axis 8 by means of suitable adjusting mechanisms. The angular division of 60° for dividing winding core 2, which results in a division of winding core 2 into six 60° winding core segments, has the particular advantage that the distances of movement for removing component 5 of winding core segments 15 to 20 from the mould can be limited to a maximum of 100 mm. Since winding core segments 15 to 20 must form the inside of component 5 in the separated condition (cf. FIGS. 2 to 4), less stringent requirements must be imposed on the quality of the positive connection between the annular winding core segments 15 to 20 in the region of the longitudinal seams and on their surface quality.

Winding core 2 and annular winding core segments 15 to 20 serving to form them are formed with a metal material, in contrast to pressure plates 9, 10.

Due to the fact that the entire structure described above, together with component 5, is fed into an autoclave for final hardening, winding core 2 is preferably formed with a metal alloy with a low coefficient of thermal expansion. A nickel[36] alloy in particular has proved a suitable material for producing winding core 2. Other alloys, which have low coefficients of thermal expansion, are equally suitable.

Figure 6:
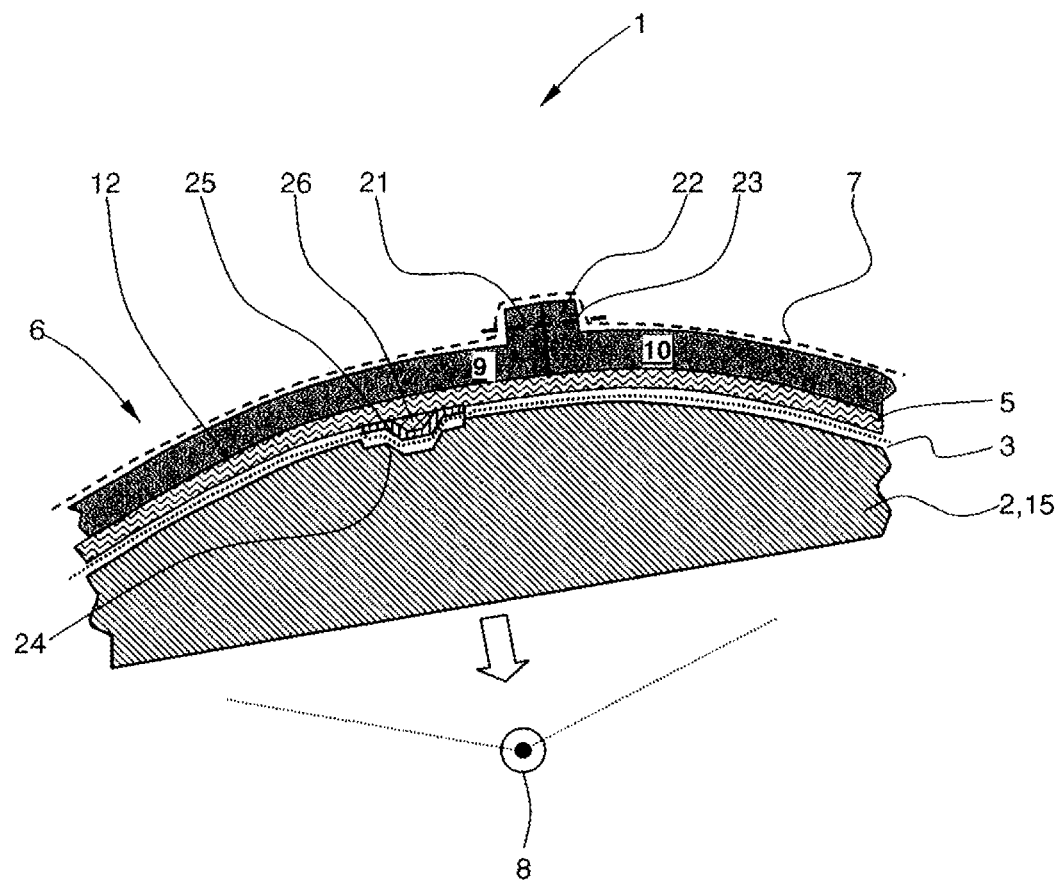
FIG. 6 shows a detailed view in the region of longitudinal flanges of two pressure plates forming the outer mould, with a trapezoidal (Ω-shaped) stiffening profile.
Figure 7:
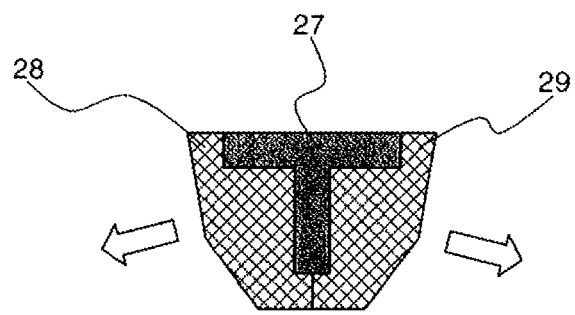
FIG. 7 shows a cross-sectional representation through a stiffening profile with a T-shaped cross-sectional geometry for the interior stiffening of the component with support elements bearing against it.

FIGS. 6 and 7 illustrate structural details relating to the connection of both pressure plates 9, 10 and the design of winding core 2.

Pressure plates 9, 10 are connected fixedly to each other along two longitudinal flanges 21, 22, which extend essentially perpendicularly to the drawing plane along the longitudinal edges of pressure plates 9, 10 throughout the length of device 1, by means of a connecting means 23, particularly in the form of a screw or clamped connection. Both pressure plates 9, 10 are surrounded by second vacuum film 7 for forming the vacuum bag. As can be seen from the representation in FIG. 6, As can be seen from the representation in FIG. 6, component 5 bears firmly against inner surface 12.

Winding core 2 has a multiplicity of recesses, one recess 24 of which is provided with a reference number. In the representation in FIG. 6, recess 24 has an essentially trapezoidal cross-sectional geometry and extends parallel to longitudinal winding core axis 8 into both end regions of device 1. Winding core 2 is completely surrounded by the first inner) vacuum film 3 to achieve a pressure-tight completion. For the production of dimensionally stable components 5 it is of decisive importance that the first vacuum film 3 nestles as smoothly as possible against winding core 2 and, in particular, also remains in close contact in recess 24 and the further recesses, not shown, so that no folds or cavities are formed. A stiffening profile 25, in particular a stringer or the like, is arranged in recess 24. Stiffening profile 25 has exactly the same cross-sectional geometry as recess 24, taking into consideration the material thickness of first vacuum film 3. Stiffening profile 25 is inserted in recess 24 of winding core 2 immediately after the application of first vacuum 3, and is then successively coated with the prepreg strip material to form component 5, i.e. "coiled" with it. This procedure allows the immediate, one-piece integration of stiffening profiles in the fuselage section during the laying process. To achieve adequate support for the wound-on component 5, and to avoid the formation of cavities, a support element 26 is inserted in stiffening profile 25. Segment 15 of winding core 2 is moved back to remove component 5 from the mould in the direction of the white arrow in the direction of longitudinal winding core axis 8. Correspondingly movement is effected with the further winding core segments 16 not shown.

FIG. 7 illustrates a stiffening profile 27 with a T-shaped cross-sectional geometry. On both sides of stiffening profile 27 are arranged support elements 28, 29 which on the hand retain stiffening profile 27, still soft during the winding process, in both shape and position, and on the other are required for removal from the mould in order to remove undercuts of stiffening profile 27 when the winding core segments are moved back. Support elements 28, 29 are preferably be pulled conveniently from stiffening profile 27 in the direction of the white arrows for removal from the mould.

LIST OF REFERENCE NUMERALS

1 Device
2 Winding core
3 First (inner) vacuum film
4 Sealant
5 Component (fuselage section)
6 Outer mould
7 Second (outer) vacuum film
8 Longitudinal winding core axis
9 Pressure plate (bent)
10 Pressure plate (bent)
11 Intermediate space (lower)
12 Inner surface (outer mould)
13 (Upper) region
14 Arrow
15 Winding core segment
16 Winding core segment
17 Winding core segment
18 Winding core segment
19 Winding core segment
20 Winding core segment
21 Longitudinal flange
22 Longitudinal flange
23 Screw connection
24 Recess
25 Stiffening profile
26 Support element
27 Stiffening profile
28 Support element
29 Support element

The invention claimed is:

1. A method for producing a fuselage section for an aircraft, having a composite fibre material, comprising the following steps:

a) application of a first vacuum film to a stable winding core and evacuation of the first vacuum film,
b) depositing of the fuselage section in layers on the stable winding core by wrapping the stable winding core with the layers,
c) application of an outer mould that is unstable compared to the stable winding core, to the fuselage section, wherein the stable winding core stabilizes the outer mould,
d) application of a second vacuum film to the outer mould,
e) aeration of the first vacuum film and evacuation of the second vacuum film in order to draw the fuselage section closer to the outer mould and detach the fuselage section from the stable winding core at least in one region, wherein the steps a)-e) form an entire arrangement, and
f) curing of the entire arrangement in an autoclave to produce the fuselage section, wherein the entire arrangement cured in the autoclave comprises the stable winding core, the first vacuum film, the layers, the outer mould and the second vacuum film, wherein the stable winding core stabilizes the outer mould during the curing.

2. The method according to claim 1, wherein a plurality of stiffening elements are inserted in recesses in the stable winding core before the fuselage section is deposited, wherein the recesses run essentially parallel to a longitudinal stable winding core axis.

3. The method according to claim 2, wherein support elements are arranged in proximity of the stiffening elements.

4. The method according to claim 1, wherein the stable winding core is collapsed inwards to remove the fuselage section after the fuselage section has cured in the autoclave.

5. The method according to claim 1, wherein the outer mould is formed along longitudinal flanges by joining at least two bent pressure plates.

6. The method according to claim 1, wherein the first vacuum film, when applied to the stable winding core, is sealed by means of a sealant.

7. The method according to claim 1, wherein the second vacuum film is sealed against the first vacuum film and the stable winding core by means of a sealant.

8. The method according to claim 1, wherein the depositing of the fuselage section in layers is carried out with at least one prepreg strip material deposited on the stable winding core, which material is formed with carbon fibres which are impregnated with a hardenable epoxy resin.

9. The method according to claim 2, wherein the plurality of stiffening members inserted into the recesses in the stable winding core are stringers.

10. The method according to claim 6, wherein the first vacuum film, when applied to the winding core, is sealed by a double sided winding tape.

* * * * *